United States Patent [19]

Coburn

[11] 4,230,009

[45] Oct. 28, 1980

[54] ROTARY TOOL POSITIONER

[75] Inventor: Robert E. Coburn, Warminster, Pa.

[73] Assignee: Molins Machine Company, Inc., Cherry Hill, N.J.

[21] Appl. No.: 10,561

[22] Filed: Feb. 9, 1979

Related U.S. Application Data

[63] Continuation-in-part of Ser. No. 814,749, Jul. 11, 1977, Pat. No. 4,162,643.

[51] Int. Cl.³ .......................... B23D 19/06; B23D 35/00

[52] U.S. Cl. .......................................... 83/504; 83/425.4; 93/58.2 R

[58] Field of Search .............. 93/58.2 R; 83/864, 884, 83/499, 498, 504, 425.4, 433, 508.2, 508.3

[56] References Cited

U.S. PATENT DOCUMENTS

| | | | |
|---|---|---|---|
| 4,010,677 | 3/1977 | Hirakawa | 93/58.2 R |
| 4,033,217 | 7/1977 | Flaum | 83/425.4 |

*Primary Examiner*—J. M. Meister
*Attorney, Agent, or Firm*—Seidel, Gonda, Goldhammer & Panitch

[57] ABSTRACT

The tool positioner of a slitter scorer has tool engaging elements which are at least in part cylindrical and coaxial with a piston connected thereto. The cylindrical portion and piston are each independently guided by stationary guide surfaces in order to minimize bending forces on the piston.

7 Claims, 5 Drawing Figures

FIG. 3
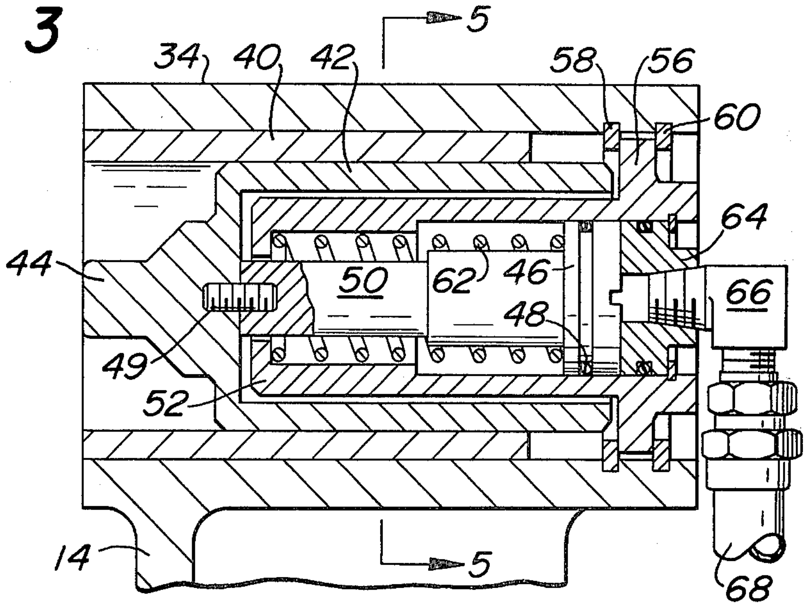
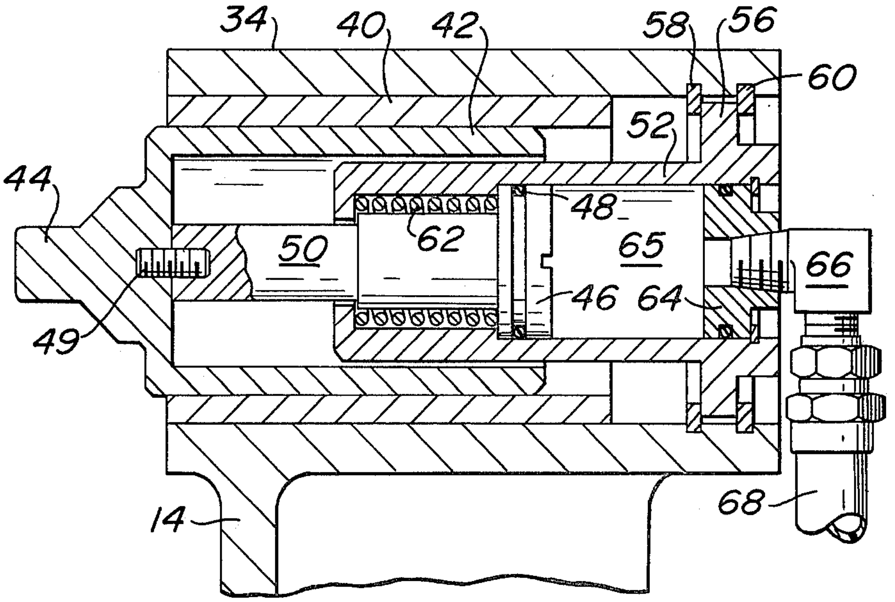
FIG. 4

ROTARY TOOL POSITIONER

CO-PENDING APPLICATION

This application is a continuation-in-part of my co-pending application Ser. No. 814,749 filed July 11, 1977 and entitled Head Locking Means For Automatic Slitter Scorer, now U.S. Pat. No. 4,162,643.

BACKGROUND

Rotary tool positioners of various types for use in an automatic slitter scorer are known. For example, see U.S. Pat. Nos. 3,587,374; 3,760,697; 4,010,677; and 4,033,217. From said patents, it is known to provide arms that pivot or otherwise move toward and away from tools on shafts. Such movement of the arms unnecessarily increases the length of the apparatus in the direction of feed.

It is desirable to maintain the length of the apparatus in the direction of feed to a minimum so that the apparatus will be interchangeable with existing apparatus in the field. Hence, I prefer to provide tool engaging members that reciprocate in a first direction toward and away from arms that reciprocate only perpendicular to the shaft axes. Circular rotary tools that are pushed axially along a shaft by tool engaging members exert a bending force on the tool engaging members in a second direction which is opposite to said first direction. The bending force wears out sliding surfaces on the tool engaging members and otherwise interferes with proper reciprocation of the tool engaging members. If the tool engaging members deflect, the precision required for setting two mating tools will be impaired. Furthermore, a reciprocating means, such as a pneumatic cylinder, is easily deflected sideways. Such deflection could bend the piston in a cylinder and render the apparatus inoperative. The present invention is directed to a solution to these problems.

SUMMARY OF THE INVENTION

The tool positioner of the present invention includes a carriage guided for reciprocation. A drive is connected to the carriage for reciprocating the carriage. A pair of arms is connected to the carriage. The arms straddle a pair of shafts disposed between side frames. A plurality of tools is provided on each of said shafts.

At least one tool engaging member is provided on each of said arms for each of said shaft. Each tool engaging member is supported by its arm for reciprocation in a direction generally perpendicular to the shaft associated therewith; each tool engaging member being at least in part a cylinder. A discrete piston is co-axial with and connected to each tool engaging member. Each piston and its associated cylindrical portion are guided by discrete stationary guide surfaces. Means for introducing a pressurized fluid to one face of each piston is provided.

It is an object of the present invention to provide a tool positioner wherein the tool engaging members thereon are structurally interrelated to minimize bending forces on the actuating means which would have a tendency to wear out seals or otherwise interfere with reciprocation of the tool engaging members.

It is another object of the present invention to provide tool positioners with novel tool engaging members which are reliable and easy to maintain.

Other objects will appear hereinafter.

For the purpose of illustrating the invention, there is shown in the drawings a form which is presently preferred; it being understood, however, that this invention is not limited to the precise arrangements and instrumentalities shown.

FIG. 3 is a longitudinal sectional view through a blade engaging member disposed in an inoperative position.

FIG. 4 is a sectional view similar to FIG. 3 but showing the blade engaging member in an operative position.

Figure 1:
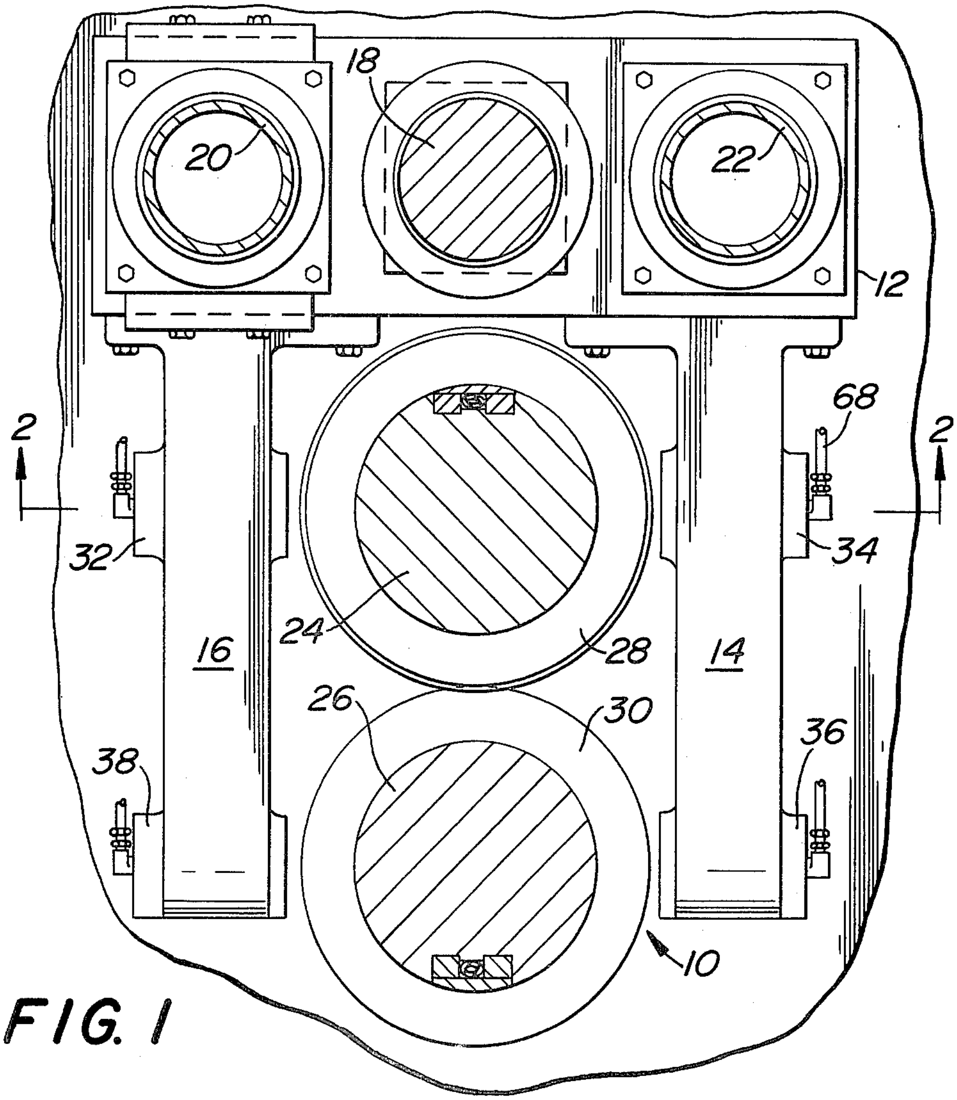
FIG. 1 is a longitudinal sectional view through a portion of a slitter scorer.
Figure 5:
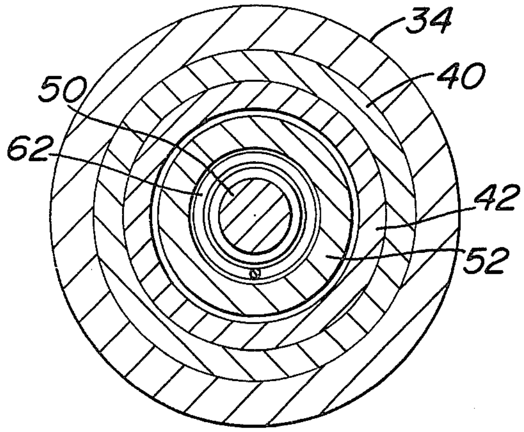
FIG. 5 is a sectional view taken along the line 5—5 in FIG. 3.

Referring to the drawings in detail, wherein like numerals indicate like elements, there is shown in FIG. 1 a tool positioner designated generally as 10. The tool positioner 10 includes a carriage 12 having at least one and preferably two depending arms 14 and 16 which are integral therewith. The tool positioner carriage 12 is provided with a lead screw drive 18 for reciprocating the carriage 12 along a pair of guide tubes 20, 22.

The carriage 12 is supported in a location so that the arms 14, 16 straddle a pair of shafts 24, 26 which are disposed one above the other. Carriage 12 may be above the elevation of the shafts 24, 26 as shown in FIG. 1 or may be orientated in a different relationship such as being below the elevation of shafts 24, 26. The shafts 24, 26 support a plurality of sets of mating tools 28, 30. The tools 28, 30 may be slitter blades or scorers or a combination of slitter and scorers. For purposes of illustration, the tools 28, 30 are scorers.

Arm 16 supports a housing 32 diametrical to the shaft 24. Arm 14 has a housing 34 which is coaxial to the housing 32. Adjacent its free end, arm 16 has a housing 38 diametrical to the shaft 26. The arm 14 is likewise provided with a housing 36 coaxial to the housing 38. Each of the housings 32, 34, 36 and 38 supports a tool engaging member for reciprocation toward and away from the longitudinal axis of the shaft juxtaposed thereto. Since the tool engaging members and their housings are identical, only housing 34 and its associated tool engaging member will be described in detail.

Figure 2:
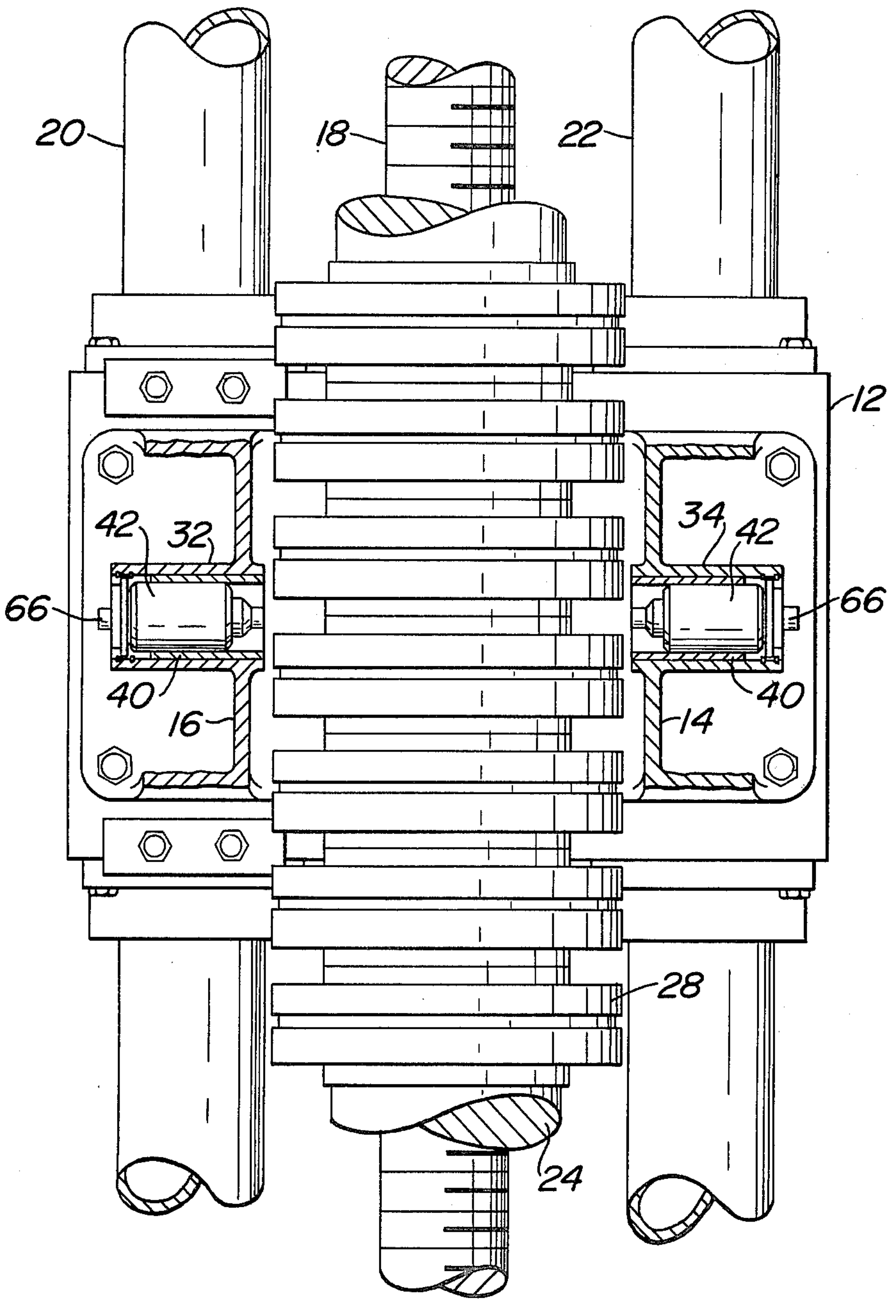
FIG. 2 is a sectional view taken along the line 2—2 in FIG. 1.

As shown more clearly in FIGS. 2 and 3, the housing 34 is cylindrical with its longitudinal axis being perpendicular to the longitudinal axis of shaft 24. A sleeve bearing 40 is press-fitted within the housing 34. The bearing 40 is preferably a self-lubricating bearing made from a material such as bronze impregnated with a suitable lubricating material. A cylindrical plunger 42 is slideably guided by the bearing 40. The diameter of plunger 42 is about one-half its length. Plunger 42 has one end wall which is closed by a pin 44 projecting from the closed end wall in a direction toward the shaft 24. As shown in FIG. 3, pin 44 has an inoperative position disposed within the housing 34. As shown in FIG. 4, pin 44 in its operative position projects toward the shaft 24 for a sufficient distance so that it will be able to make contact with a side face of the tool 28.

A piston 46 is coaxial with the plunger 42. Piston 46 has a peripheral seal 48 and a reduced diameter portion 50 connected at one end to the end wall of the plunger 42. The last-mentioned connection is preferably by way of a threaded member 49 whereby the piston 46 may be disconnected from the plunger 42.

The piston 46 is guided for reciprocation by way of a stationary guide 52 which is cylindrical and provided with an end wall 54 at one end. The end wall 54 is provided with a hole through which the reduced diameter portion 50 extends. The diameter of guide 52 is about one-half its length. At its other end, the guide 52 has a end wall 56 extending radially outwardly therefrom. The end wall 56 is retained between a pair of snap rings 58, 60. The snap rings 58, 60 extend into grooves on the inner peripheral surface of the housing 34. A coil spring 62 is disposed between the end wall 54 and one face of the piston 46. Spring 62 biases the pin 44 to the inoperative position as shown in FIG. 3.

A head member 64 is releasably retained within the guide 52 adjacent one end thereof and remote from the end wall 54. A pressure chamber 65 is defined by the inner periphery of guide 52, one end face of piston 46, and one end face of head member 64. A right angle connection 66 is threadedly coupled to a bore within the head member 64. The connection 66 is connected to a source of pressurized fluid such as pressurized air, by way of a flexible conduit 68.

At the end of a production order, the tool positioner 10 shifts the tools 28, 30 to one end of the shafts and then repositions the tools 28, 30 for a subsequent production run. In order that tools 28, 30 may be shifted axially along their shafts 24, 26 with even pressure, the pin 44 and the comparable pins associated with housing 32, 38, 36 are operated simultaneously so as to be in an operative or inoperative disposition. Hence, conduit 68 and the comparable conduit associated with housing 32, 36 and 38 are connected to a single source of pressure.

When it is desired to move the pin 44 and its mating pin associated with housing 32 to an operative position, pressure is introduced into the chamber 65 by way of conduit 68 and connection 66. The pressurized fluid shifts the piston 46 from the position shown in FIG. 3 to the position shown in FIG. 4 thereby compressing spring 62. When the pressure in chamber 65 is released, by way of a supply and exhaust valve associated with conduit 68, spring 62 expands and retracts the pin 44 to the inoperative position shown in FIG. 3. Since the plunger 42 is cylindrical and independently guided by bearing 40 as compared with piston 46 which is independently guided by guide 52, bending stresses imparted to the pin 44 by contact with a side face of blade 28 are minimized. If, for any reason, it is desired to replace pin 44, snap ring 60 is removed and the elements within bearing 40 are removed axially as a unit to the right in FIG. 3.

The present invention may be embodied in other specific forms without departing from the spirit or essential attributes thereof and, accordingly, reference should be made to the appended claims, rather than to the foregoing specification, as indicating the scope of the invention.

I claim:

1. In a tool positioner for use in a slitter scorer, the improvement comprising a housing supported by said tool positioner, a cylindrical bearing within said housing, a cylindrical plunger coaxial with and guided by said bearing, the axial length of said plunger being greater than its diameter, said plunger having a pin at one end thereof, a piston coaxial with said plunger and spaced from said one end of said plunger, a piston rod having one end connected to said piston and its other end connected to said one end of said plunger, a stationary cylindrical guide in said housing for guiding said piston, and means for introducing a pressurized fluid to one face of said piston for causing said piston to move in a first direction to a position wherein said plunger pin projects out of said housing to an operative position for contact with a tool.

2. In a tool positioner in accordance with claim 1 wherein said stationary cylindrical guide is radially inward of said plunger and extends into said plunger through an open end thereof.

3. In a tool positioner in accordance with claim 2 including a spring means disposed between said piston and a stationary surface within said housing, said spring means biasing said piston in a direction opposite said first direction to an inoperative position.

4. A tool positioner comprising a carriage, a pair of guide tubes guiding said carriage, a lead screw drive connected to said carriage for reciprocating said carriage along said tubes, said carriage having a pair of arms generally perpendicular to the direction of reciprocation of said carriage, a pair of shafts straddled by said arms, a plurality of sets of mating tools on said shafts, each arm having a discrete tool engaging member associated with each shaft, the tool engaging members associated with each shaft being operable in unison, each tool engaging member including a cylindrical plunger having a pin at one end thereof, means associated with each plunger for reciprocating each plunger in an axial direction toward and away from the longitudinal axis of its associated shaft, each of said means including a piston coaxial with its associated plunger and connected to its associated plunger, each piston having a diameter which is different from the diameter of its associated plunger, a discrete stationary cylindrical guide member coaxial with each plunger and piston, and said means including a discrete fluid connection for introducing fluid to one face of each piston for moving its piston and plunger in a direction towards its associated shaft.

5. A tool positioner in accordance with claim 4 wherein each plunger surrounds the piston associated therewith, and a self-lubricating sleeve bearing surrounding each plunger for guiding each plunger.

6. A tool positioner in accordance with claim 4 wherein each plunger and stationary guide has an axial length which is greater than its diameter.

7. A positioner for axially moving a circular rotary tool on a shaft comprising a carriage, means for guiding said carriage parallel to the axis of the shaft, drive means for reciprocating said carriage, support means extending from said carriage a distance beyond the axis of the shaft, a tool engaging means on said support means, said tool engaging means being supported by said support means for reciprocation in a direction perpendicular to the axis of the shaft, said support means having a discrete stationary guide surface for guiding said tool engaging means, a cylinder and a discrete piston coaxial therewith for urging said tool engaging means toward the axis of the shaft into engagement with a tool, one face of said piston being connected to said tool engaging means, means for introducing a pressurized fluid into said cylinder against the opposite face of said piston, and means for mounting said cylinder in said support means coaxial with said tool engaging means, the outer surface of said cylinder and the inner surface of said tool engaging means defining a cylindrical space therebetween whereby said piston is independent of forces applied perpendicular to said tool engaging means.

* * * * *